US010871944B2

(12) United States Patent
Stucker et al.

(10) Patent No.: US 10,871,944 B2
(45) Date of Patent: *Dec. 22, 2020

(54) IMPLICIT NARRATION FOR AURAL USER INTERFACE

(71) Applicant: Microsoft Technology Licensing, LLC, Redmond, WA (US)

(72) Inventors: Brian S. Stucker, Redmond, WA (US); David Lu, Seattle, WA (US); Allen L. Ussher, Seattle, WA (US); Jennifer L. Bost, Carnation, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/664,268

(22) Filed: Oct. 25, 2019

(65) Prior Publication Data
US 2020/0057608 A1 Feb. 20, 2020

Related U.S. Application Data

(63) Continuation of application No. 15/358,583, filed on Nov. 22, 2016, now Pat. No. 10,489,110.

(51) Int. Cl.
| G06F 3/048 | (2013.01) |
| G06F 3/16 | (2006.01) |
| G06Q 10/10 | (2012.01) |
| G06F 16/34 | (2019.01) |
| G06F 3/0481 | (2013.01) |
| G10L 13/08 | (2013.01) |
| G06Q 50/00 | (2012.01) |

(52) U.S. Cl.
CPC ............ *G06F 3/167* (2013.01); *G06F 3/0481* (2013.01); *G06F 16/345* (2019.01); *G06Q 10/107* (2013.01); *G10L 13/08* (2013.01); *G06Q 50/01* (2013.01)

(58) Field of Classification Search
CPC . G06F 3/16; G06F 3/167; G06F 3/048; G06F 3/0481; G06F 17/27; G06F 17/2785; G06F 17/30; G06F 17/30719; G06F 16/345; G06F 3/0482; G10L 13/00; G10L 13/08; H04L 51/00; H04M 1/72552; G06Q 10/107
See application file for complete search history.

(56) References Cited

U.S. PATENT DOCUMENTS 6,975,988 B1 * 12/2005 Roth .................... G06Q 10/107
345/184
8,996,376 B2 * 3/2015 Fleizach ................. G10L 13/00
704/260

(Continued)

*Primary Examiner* — Xiomara L Bautista
(74) *Attorney, Agent, or Firm* — Michael Best & Friedrich LLP

(57) ABSTRACT

A computing device and a method for controlling narration. The computing device comprises a display device displaying a visual user interface including textual information and an electronic processor configured to map the textual information to an implicit audio narration, wherein mapping textual information to the implicit audio narration has a scalable level of precision to the textual information depending on the visual user interface, and the electronic processor further configured to output the implicit audio narration.

17 Claims, 10 Drawing Sheets

(56) References Cited

U.S. PATENT DOCUMENTS

| | | | | |
|---|---|---|---|---|
| 9,087,024 B1* | 7/2015 | Hayden | | G06F 3/0481 |
| 2002/0002462 A1* | 1/2002 | Tetsumoto | | H04M 3/4938 |
| | | | | 704/270.1 |
| 2002/0085043 A1* | 7/2002 | Ribak | | B60K 35/00 |
| | | | | 715/810 |
| 2002/0184030 A1* | 12/2002 | Brittan | | G10L 13/08 |
| | | | | 704/260 |
| 2003/0035412 A1* | 2/2003 | Wang | | H04W 4/00 |
| | | | | 370/352 |
| 2005/0113113 A1* | 5/2005 | Reed | | H04L 67/04 |
| | | | | 455/456.3 |
| 2006/0069567 A1* | 3/2006 | Tischer | | G10L 13/033 |
| | | | | 704/260 |
| 2006/0218191 A1* | 9/2006 | Gopalakrishnan | | G06F 16/41 |
| 2007/0081639 A1* | 4/2007 | Patel | | H04M 1/72552 |
| | | | | 379/88.14 |
| 2008/0040669 A1* | 2/2008 | Plocher | | G08B 17/00 |
| | | | | 715/727 |
| 2008/0095333 A1* | 4/2008 | Tudor | | H04M 7/0054 |
| | | | | 379/88.17 |
| 2009/0018838 A1* | 1/2009 | Ahn | | G10L 13/00 |
| | | | | 704/260 |
| 2009/0254345 A1* | 10/2009 | Fleizach | | G10L 19/018 |
| | | | | 704/260 |
| 2010/0153108 A1* | 6/2010 | Szalai | | G10L 17/04 |
| | | | | 704/243 |
| 2011/0013756 A1* | 1/2011 | Davies | | G10L 15/22 |
| | | | | 379/88.14 |
| 2011/0029898 A1* | 2/2011 | Malik | | H04L 51/16 |
| | | | | 715/758 |
| 2011/0295934 A1* | 12/2011 | McCormack | | G06F 3/04855 |
| | | | | 709/203 |
| 2012/0290289 A1* | 11/2012 | Manera | | G06F 16/345 |
| | | | | 704/9 |
| 2014/0070957 A1* | 3/2014 | Longinotti-Buitoni | | |
| | | | | G06F 3/011 |
| | | | | 340/870.01 |
| 2017/0171117 A1* | 6/2017 | Carr | | H04L 51/16 |

* cited by examiner

IMPLICIT NARRATION FOR AURAL USER INTERFACE

RELATED APPLICATIONS

This application is a continuation of and claims priority to U.S. application Ser. No. 15/358,583 filed Nov. 22, 2016, the entire content of which is incorporated herein by reference.

FIELD

Embodiments relate to systems and methods providing implicit narration of textual information presented by a user interface on a display.

BACKGROUND

A user typically interacts with a computer running a software program or application via a visual user interface (for example, a graphical user interface (GUI)). The user may use a touchpad, keyboard, mouse, or other input device to enter commands, selections, and other input. The application then responds to or processes this input. The graphical user interface may present links, controls, data, or other interactive options for the user in a visual form such as texts or images. While graphical user interfaces are useful, there are times when an aural or audio interface is useful. For example, an audio interface is useful when a user has impaired vision or when it is impossible or impractical to view the graphical user interface, such as when a user is operating an automobile and maintaining his her gaze on the road ahead.

SUMMARY

Narration-based applications have been developed as a mechanism of providing an audio interface for applications designed for user interaction via a graphical user interface. Current, narration-based applications generally deliver information contained in the graphical user interface by reading (for example, via text-to-speech conversion) what is shown on the screen in a literal or verbatim manner. They are designed to read exactly what is on the screen in an effort to ensure fidelity in the transformation from a visual experience to an audible experience. However, literally reading of elements in the graphical user interfaces often produces an audio output that is difficult to comprehend. Additionally, user interfaces built primarily for a visual framework do not translate well to an audible experience. Finally, currently-available narration-based user interfaces usually fail to consider human cognitive processes that take place while visually gathering information from a display screen and translate those cognitive processes into processes that occur when gathering information aurally. Information laid out on a display screen is typically scanned and rescanned by the human eye and brain using context and association. This facilitates navigation of the information. Translating textual and/or graphical information to an audio format (with precision) results in overloading the listener with details since the streamed format prevents the user from efficiently scanning/re-scanning material. As a result, task completion times are often increased by a factor of three to ten times the original visual task completion time as listeners struggle to comprehend what they are listening to.

Thus, using embodiments of implicit narration provided herein, the textual information on the screen of a computer or similar user device is re-interpreted by accounting for limits of human cognition. For example, instead of reading a time stamp (12:48 μm) a relative indication of the same information (such as a few minutes ago) may be used. Additionally, varying the grammar and vocabulary of the implied narration further enhances the experience when reading through a longer list of materials.

One embodiment provides a computing device. The computing device includes a display device displaying a visual user interface including textual information and an electronic processor. The electronic processor is configured to map the textual information to an implicit audio narration, wherein mapping textual information to the implicit audio narration has a scalable level of precision to the textual information depending on the visual user interface. The electronic processor is also configured to output the implicit audio narration.

Another embodiment provides a method for controlling narration. The method includes receiving a textual information from a visual user interface. The method also includes mapping, with an electronic processor, the textual information to an implicit audio narration. The mapping of textual information to the implicit audio narration has a scalable level of precision to the textual information depending on the visual user interface. The method further includes outputting the implicit audio narration.

Another embodiment provides a tangible machine-readable medium containing computer-executable instructions that when executed by one or more processors cause the one or more processors to perform a method for controlling narration. The method includes receiving textual information from a visual user interface. The method also includes mapping the textual information to an implicit audio narration. The mapping of textual information to the implicit audio narration has a scalable level of precision to the textual information depending on the visual user interface. The method further includes outputting the implicit audio narration.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 10 illustrates an example narration of one of the items displayed by the visual user interface shown in FIG. 4, in accordance with some embodiments.

Figure 1:
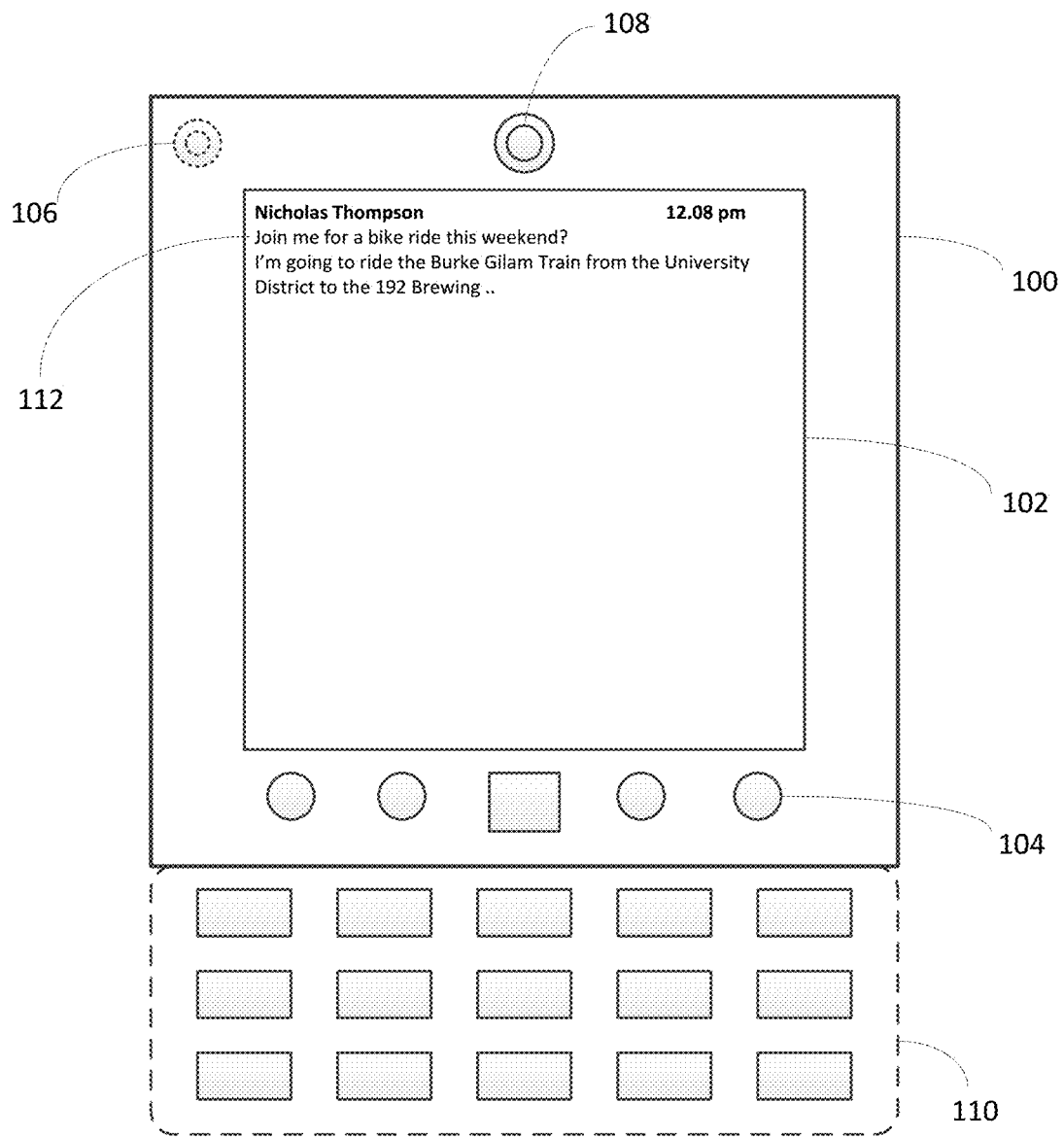
FIG. 1 illustrates a computing device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION

Before any embodiments are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Some embodiments may be a machine-implemented method, a tangible machine-readable medium having a set of instructions detailing a method stored thereon for at least one processor, or a user interface narrator for a computing device.

FIG. 1 illustrates a computing device 100 in accordance with some embodiments. The computing device 100 includes a display 102, input 104, speaker 106, an optional camera 108, an optional keyboard 110 and a visual user interface 112 displaying textual information. To improve interactions with sight-impaired users or when it is impossible or impractical to view the graphical user interface, the computing device 100 may use a narration controller (described below) to vocalize items in the visual user interface 112, such as graphics and text. Vocalizing is the creation of implicit audio data to be played to the user representing the items on the visual user interface 112.

Figure 2:
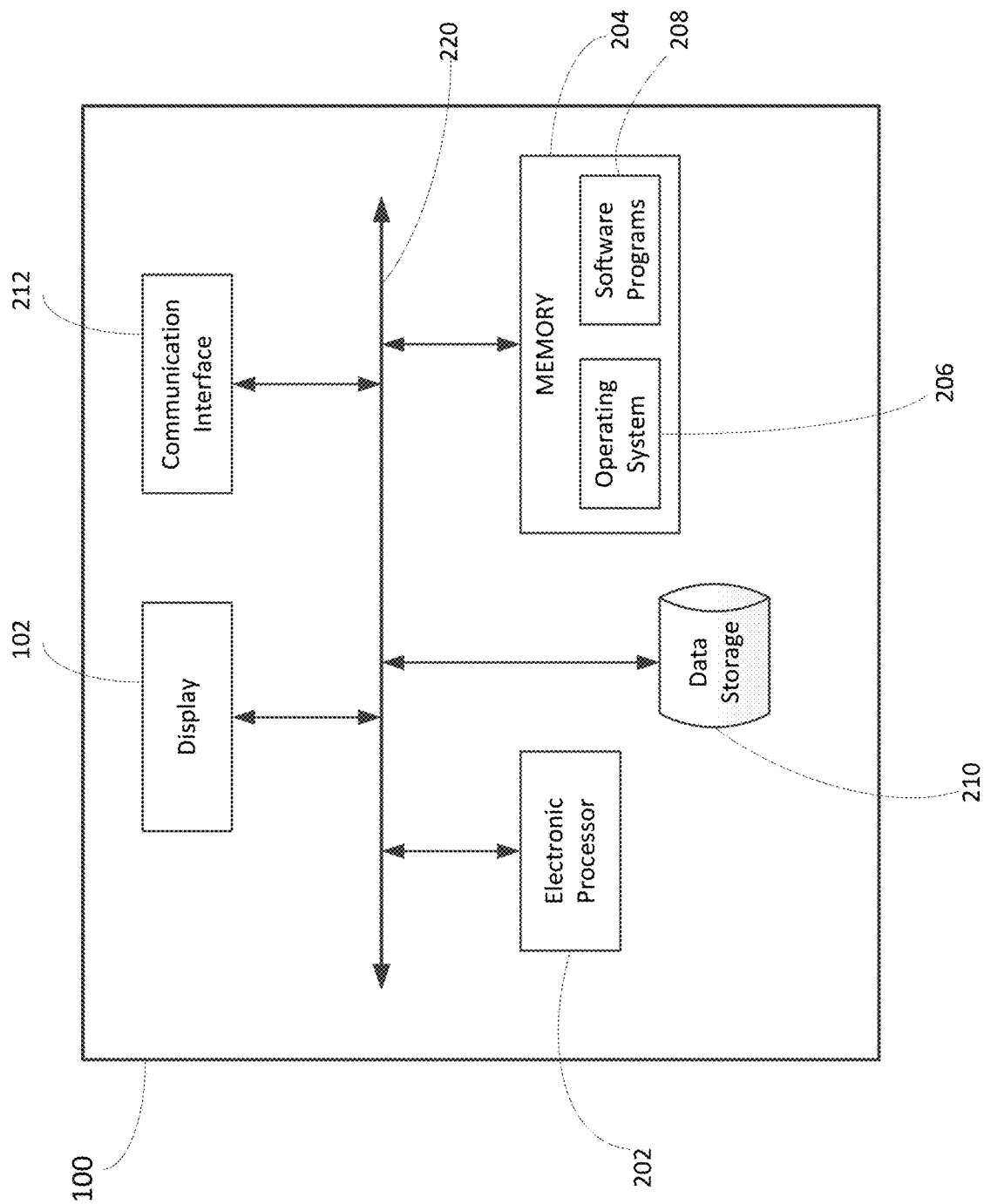
FIG. 2 illustrates a block diagram of the computing device shown in FIG. 1 in accordance with some embodiments.

FIG. 2 illustrates a block diagram of the computing device 100 in FIG. 1 in accordance with some embodiments. The computing device 100 may combine hardware, software, firmware, and system on-a-chip technology to implement a narration controller. The computing device 100 may include an electronic processor 202, a memory 204, data storage device 210, a display 102, a communication interface 212 and a bus 220. The memory 204 may include an operating system 206 and one or more software programs 208 that provide algorithms to analyze items in the visual user interface 112 and render data associated with the analyzed items for vocalization. The electronic processor 202 may include at least one processor or microprocessor that interprets and executes a set of instructions stored in the memory 204. The one or more programs 208 may be configured to implement the methods described herein. The memory 204 may include volatile memory elements (for example, random access memory (RAM)), nonvolatile memory elements (for example, ROM), and combinations thereof. The memory 204 may have a distributed architecture, where various components are situated remotely from one another, but may be accessed by the electronic processor 202.

The data storage device 210 may include a non-transitory, tangible, machine-readable storage medium that stores machine-readable code or instructions. In one example, the data storage device 210 stores a set of instructions detailing a method provide herein that when executed by one or more processors cause the one or more processors to perform the method. The data storage device 210 may also be a database or a database interface for storing an application module. In one example, the data storage 210 is located external to the computing device 100.

The bus 220, or other component interconnection, may permit communication among the components of the computing device 100. The bus 220 may be, for example, one or more buses or other wired or wireless connections, as is known in the art. The bus 220 may have additional elements, which are omitted for simplicity, such as controllers, buffers (for example, caches), drivers, repeaters and receivers, or other similar components, to enable communications. The bus 220 may also include address, control, data connections, or a combination of the foregoing to enable appropriate communications among the aforementioned components.

The communication interface 212 provides the computing device 100 a communication gateway with an external network (for example, a wireless network, the internet, etc.). The communication interface 212 may include, for example, an Ethernet card or adapter or a wireless local area network (WLAN) card or adapter (for example, IEEE standard 802.11a/b/g/n). The communication interface 212 may include address, control, and/or data connections to enable appropriate communications on the external network.

Figure 3:
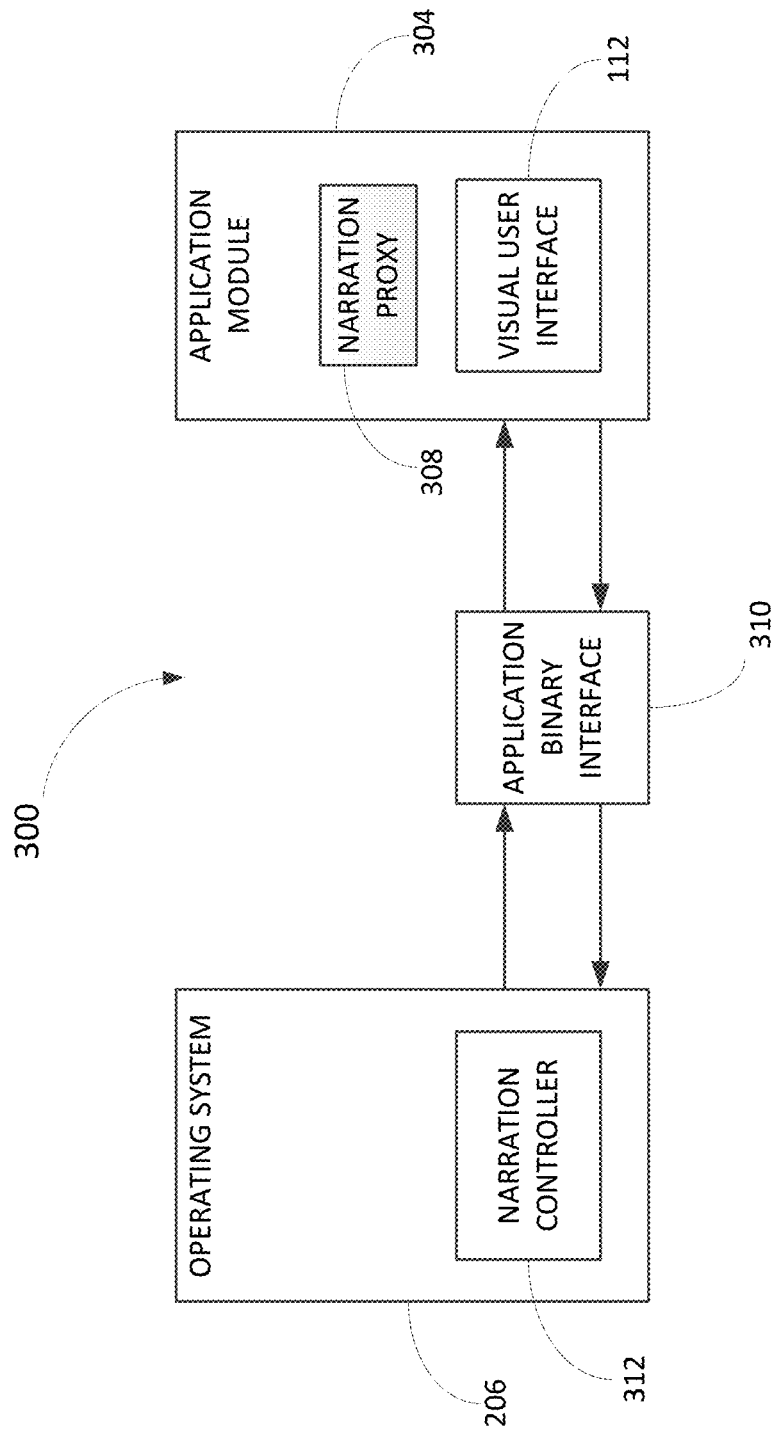
FIG. 3 illustrates a software application interaction, in accordance with some embodiments.

FIG. 3 illustrates an interaction 300 of software applications, in accordance with some embodiments. The computing device executes the operating system 206, which manages a software application module 304. The application module 304 is a software application, or portion of a software application. The application module 304 includes a visual user interface 112 and a narration proxy 308. In one embodiment, the application module 304 communicates with the operating system 206 via an application binary interface (ABI) 310. The application binary interface 310 is a tool allowing the application module 304 to access specific tools, functions, and/or calls provided by the operating system 206. One of the tools provided by the operating system 206 may be a narration controller 312. The narration controller 312 converts text from an application module 304 to an audio format to be played using the speaker 106 for a user. For example, the application module 304 may include a visual user interface 112 to receive inputs from a user via an input/output interface 212. The narration controller 312 may convert textual and graphical information presented in the visual user interface 112 to an audio format for presentation to the user. In some embodiments, the narration proxy 308 may pull data from an item in the visual user interface 112 and provide narration data associated with the item to the narration controller 312. The narration proxy 308 may be an extendible application markup language wrapping of an item in the visual user interface 112.

Figure 4:
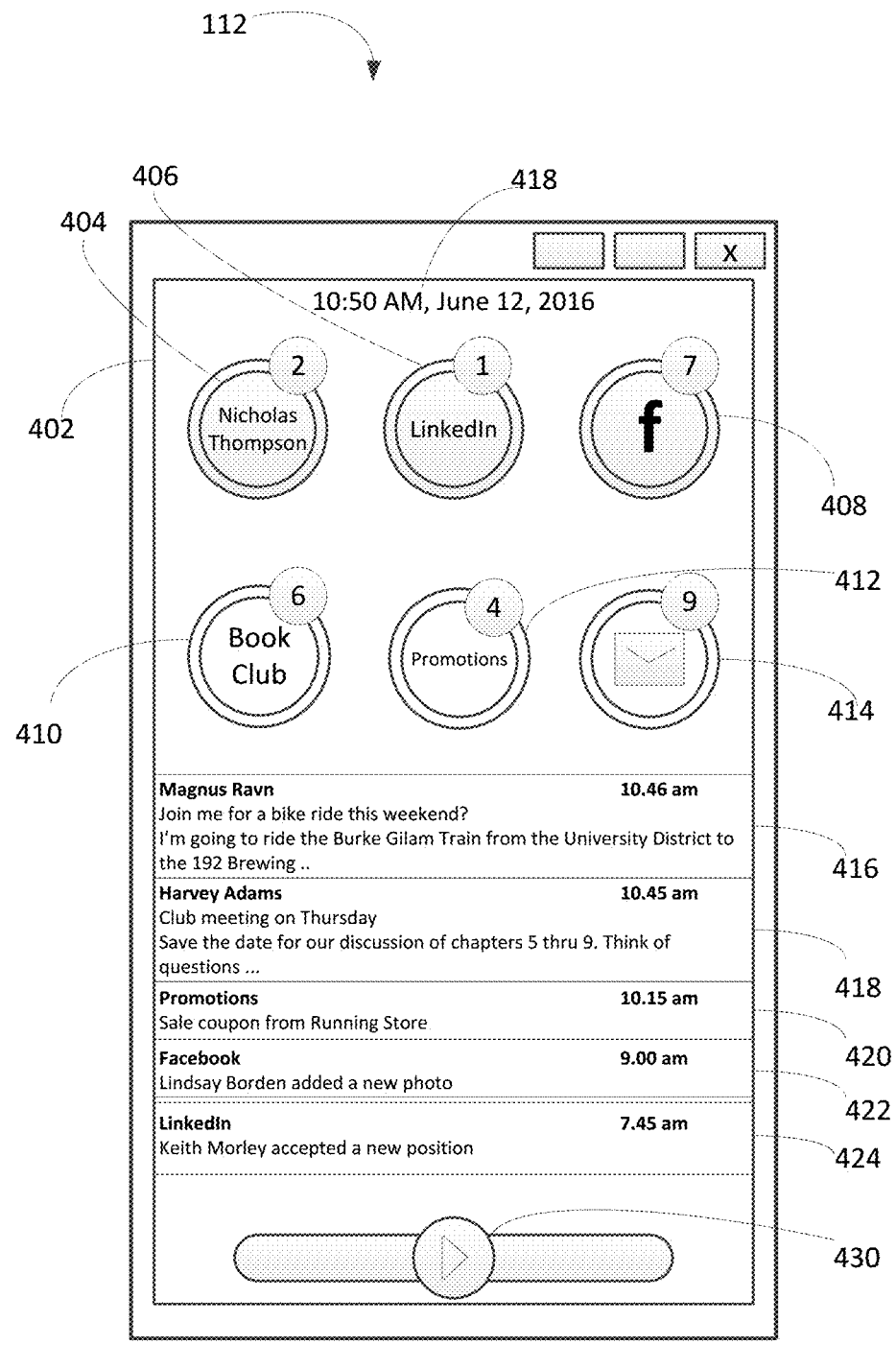
FIG. 4 illustrates a visual user interface of the computing device shown in FIG. 1, in accordance with some embodiments.

FIG. 4 illustrates a visual user interface 112, in accordance with some embodiments. The visual user interface 112 includes a visual frame 402 (for example, a window). The visual frame 402 includes one or more items 404, 406, 408, 410, 412, 414, 416, 418, 420, 422, and 424. In one example, the items 404, 406, 408, 410, 412, and 414 are icons that may include both textual and graphical information. For example, the item 404 may be associated with a message box of a user, "Nicholas Thompson." The item 404 may also show a count of the number of unread messages (in this case, "2") that the user has received. The item 406 may be associated with messages from a software application, "LinkedIn." The item 406 may also show a count of the number of unread messages (in this case, "1") that the user has received from "LinkedIn." The item 408 may be associated with messages from a software application, for example, "Facebook," and may also show a count of the number of unread messages (in this case, "7") that the user has received from the "Facebook" application. The item 410 may be associated with messages from an application namely "Book Club" and may also show a count of the number of unread messages (in this case, "6") that the user has received from the "Book Club" application. The item 412 may be associated from an application namely "Promotions" and may also shows a count of the number of unread messages (in this case, "4") that the user has received from the "Promotions" application. The item 414 may be associated with messages from an email system. The item 414 may also shows a count of the number of unread emails (in this case, "9") that the user has received.

In some embodiments, the narration controller 312 vocalizes the graphical and textual information associated with items 404, 406, 408, 410, 412, 414, 416, 418, 420, 422, and 424 in response to an input command (for example, using input 104) that the user provides to computing device 100. In one example, the input command includes an audio command. In another example, the input command is provided through a touch-sensitive display that displays visual user interface 112. In another embodiment, the input command is provided using a keypad (or keyboard) 110. In some embodiments, the visual user interface 112 includes a touch-sensitive icon 430 that is used to engage the narration controller 312. In an example, when the touch-sensitive icon 430 is activated, the narration controller 312 receives items 404, 406, 408, 410, 412, 414, 416, 418 and maps the textual and/or graphical information associated with items 404, 406, 408, 410, 412, 414, 416, 418, 420, 422, and 424 to audio narration, which is then fed to the speaker 106 for the user of computing device 100 to hear.

Figure 5:
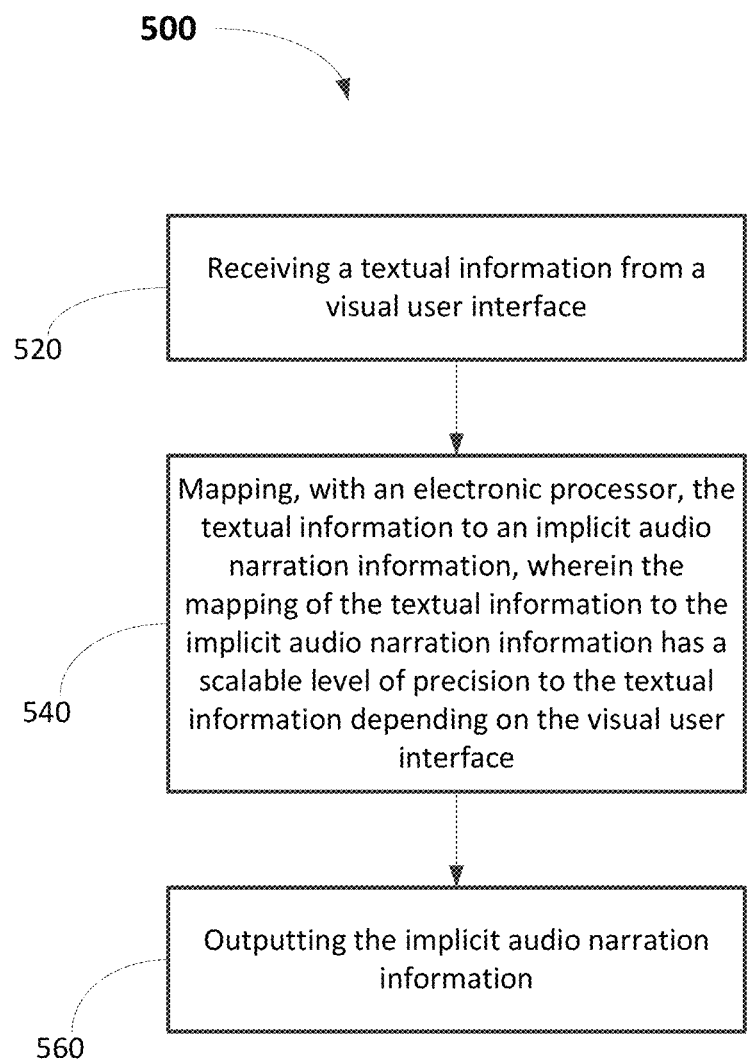
FIG. 5 is a flow chart of a method for controlling narration in accordance with some embodiments.

FIG. 5 is a flow chart of a method 500 for controlling narration in accordance with some embodiments. At block 520, the method 500 includes receiving textual information from the visual user interface 112. In one example, the textual information from the visual user interface 112 is received at the narration controller 312. Examples of textual information may include emails, text messages and other notifications from software programs or applications. Each of the emails, text messages and other notifications may have multiple text fields associated it such as timestamp, sender name, receiver names, subject, message body, etc. In some embodiments, the method 500 includes receiving graphical information from the visual user interface 112. The graphical information may be associated with icons presented at the visual user interface 112 (for example, Facebook, LinkedIn, etc.).

At block 540, the method 500 includes mapping, with an electronic processor 202, the textual information to an implicit audio narration. The mapping, with the electronic processor 202, of the textual information to the implicit audio narration has a scalable level of precision to the textual information depending on the visual user interface 112. In one example, the mapping the textual information to the implicit audio narration having a scalable level of precision includes mapping one or more fields associated with the textual information of an item 416, 418, 420, 422, 424, and 426 to one of the fuzzy time groupings (shown in FIG. 8). In one example, the method 500 includes determining, with the electronic processor 202, the scalable level of precision for the mapping of the textual information to the implicit audio narration. In one embodiment, determining the scalable level of precision include identifying and replacing all of the words in the textual information with fewer number of words (and most likely different words) that may be used for implicit audio narration. Examples of several mappings having a scalable level of precision that may be used for mapping textual information to the implicit audio narration are provided below. In one example, determining the scalable level of precision includes eliminating unnecessary trivia or information within the textual information by scaling the fidelity to the context associated with the textual information. In some embodiments, the mapping the textual information to the audio narration having a scalable level of precision includes mapping the textual information of an item (for example, item 416, 418, 420, 422, 424, and 426) to any one of the mappings shown in FIG. 9. In one embodiment, the electronic processor 202 is configured to map textual information to audio narration by varying at least one of vocabulary and grammar of the textual information.

In some embodiments, the method 500 includes determining, with the electronic processor 202, a fuzzy time grouping for a plurality of time-stamps associated with the textual information and generating audio narration including the fuzzy time grouping.

At block 560, the method 500 includes outputting the audio narration. In one embodiment, the method 500 includes analyzing, with the electronic processor 202, the textual information received from the visual user interface.

Some examples of the method 500 mapping and outputting implicit audio narration are provided below.

Example A

Timestamp: Friday, October 28$^{th}$, 2016
Sender: Frank, frank@example.com>
Receiver: you, Carol Smith carol@example.com, Jim jim@example.com, Arnold Arnold@example.com, Bob bob@example.com
Subject: Meet for lunch today?
Message body: Hey all, who is interested in going out to lunch today?
The narration information generated from the various fields associated with the email shown above in Example A are as follows:
Time: On Friday (assuming the time stamp is within the last 7 days)
Sender: Frank
Verb: asked
Direct object: none
Subject: "Meet for lunch today"
The implicit audio narration that may be generated for the above email is given below:
On Friday, Frank asked, "Meet for lunch today?"

Example B

Assuming today's date is Tuesday, November 1$^{st}$, 2016 and the following is the email message provided at the visual user interface 112:

Timestamp: Monday, October 24$^{th}$, 2016 (over a week ago)
   Sender: Jim jim@example.com
   Receiver: Carol Smith carol@example.com, Jim jim@example.com
   Subject: Samples for distributors
   Message body: Here are the samples that the distributors requested.
The implicit audio narration that may be generated for the above email is given below:
On October 24th, Jim messaged Carol and Jim about "Samples for distributors."

Example C

Assuming today's date is Tuesday, November 1$^{st}$, 2016 and the following is the email message rendered at the visual user interface 112:
Timestamp: Tuesday, November 1$^{st}$, 2016 (assume it was sent 5 minutes ago)
   Sender: Kim kim@example.com
   Receiver: you you@example.com, (assume it is the current user)
   Subject: Let's meet to discuss sales numbers
   Message body: Hey, are you free to meet tomorrow?
The implicit audio narration that may be generated for the above email is given below:
A moment ago, Kim emailed you about "Let's meet to discuss sales numbers."

Figure 6:
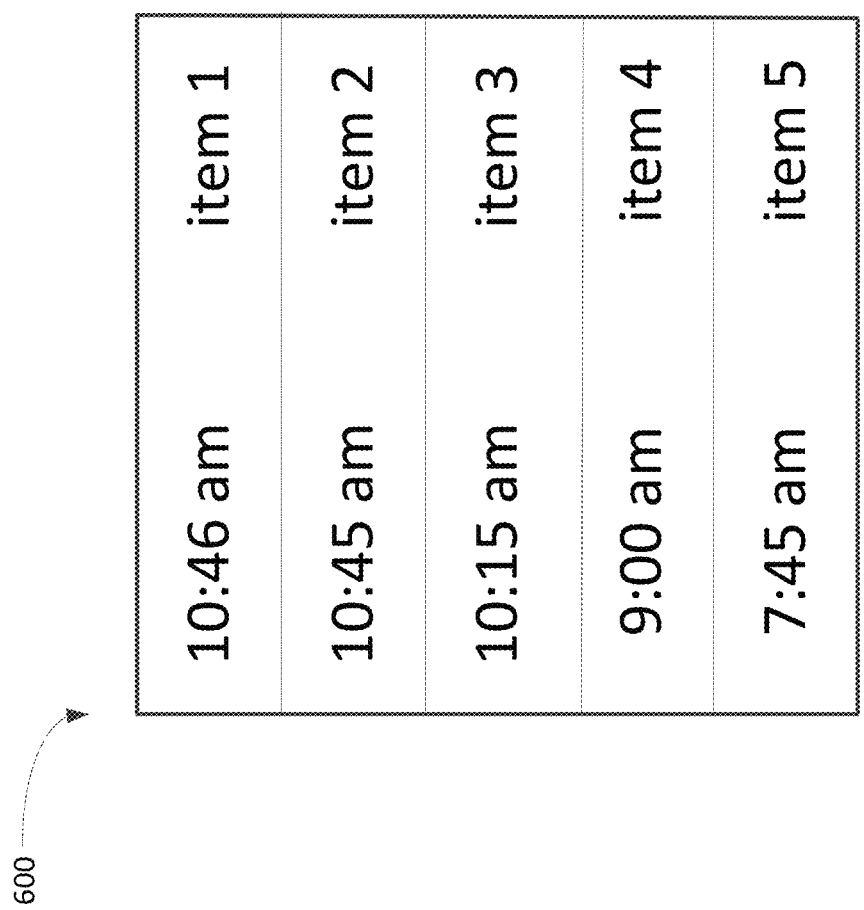
FIG. 6 illustrates an ordering of the times associated with items displayed on the visual user interface of FIG. 4, in accordance with some embodiments.

FIG. 6 illustrates an ordering 600 of the time-stamps 602 associated with some of the items displayed on the visual user interface of FIG. 4, in accordance with some embodiments. As shown in FIG. 6, "Item 1" has a time-stamp "10:46 am," and corresponds to a message from "Magnus Ravn" (416 shown in FIG. 4). "Item 2" has a time-stamp "10:45 am," and corresponds to a message from "Harvey Adams" (418 shown in FIG. 4). "Item 3" has a time-stamp "10:15 am," and corresponds to a message from "Promotions" (420 shown in FIG. 4). "Item 4" has a time-stamp "9:00 am," and corresponds to a message from "Facebook" (422 shown in FIG. 4). "Item 5" has a time-stamp "7:45 am," and corresponds to a message from "LinkedIn" (424 shown in FIG. 4).

Figure 7:
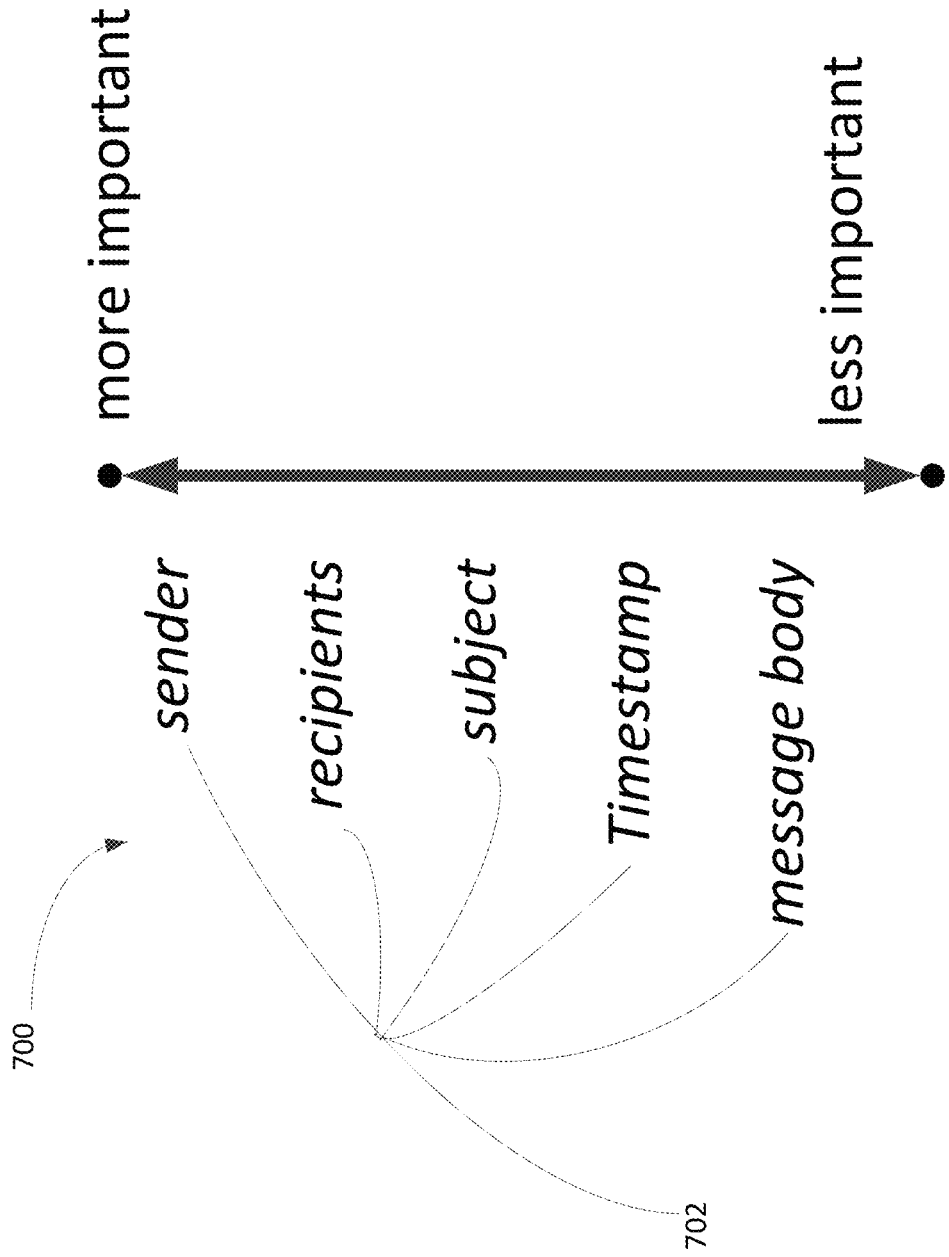
FIG. 7 illustrates a scale of the relative importance of the different portions of the content associated with each of the items presented in the visual user interface shown in FIG. 4, in accordance with some embodiments.

FIG. 7 illustrates a scale 700 of the relative importance of fields 702 within textual information associated with each of the items presented in the visual user interface shown in FIG. 4, in accordance with some embodiments. In the example shown in FIG. 7, the fields 702 include a sender field including a "sender", a recipients field including "recipients" of the message, a subject field including "subject" of the message, a timestamp field including the "time stamp" of the message, and a "message body" field including the entire message. As shown in FIG. 7, the "sender" is given a higher priority or importance compared to the "recipients" during a mapping of textual information to implicit audio narration. Similarly, the "recipients" may be given higher priority or importance compared to the "subject," and the "subject" may be given higher priority or importance compared to the "time-stamp" during the mapping of textual information to implicit audio narration.

Figure 8:
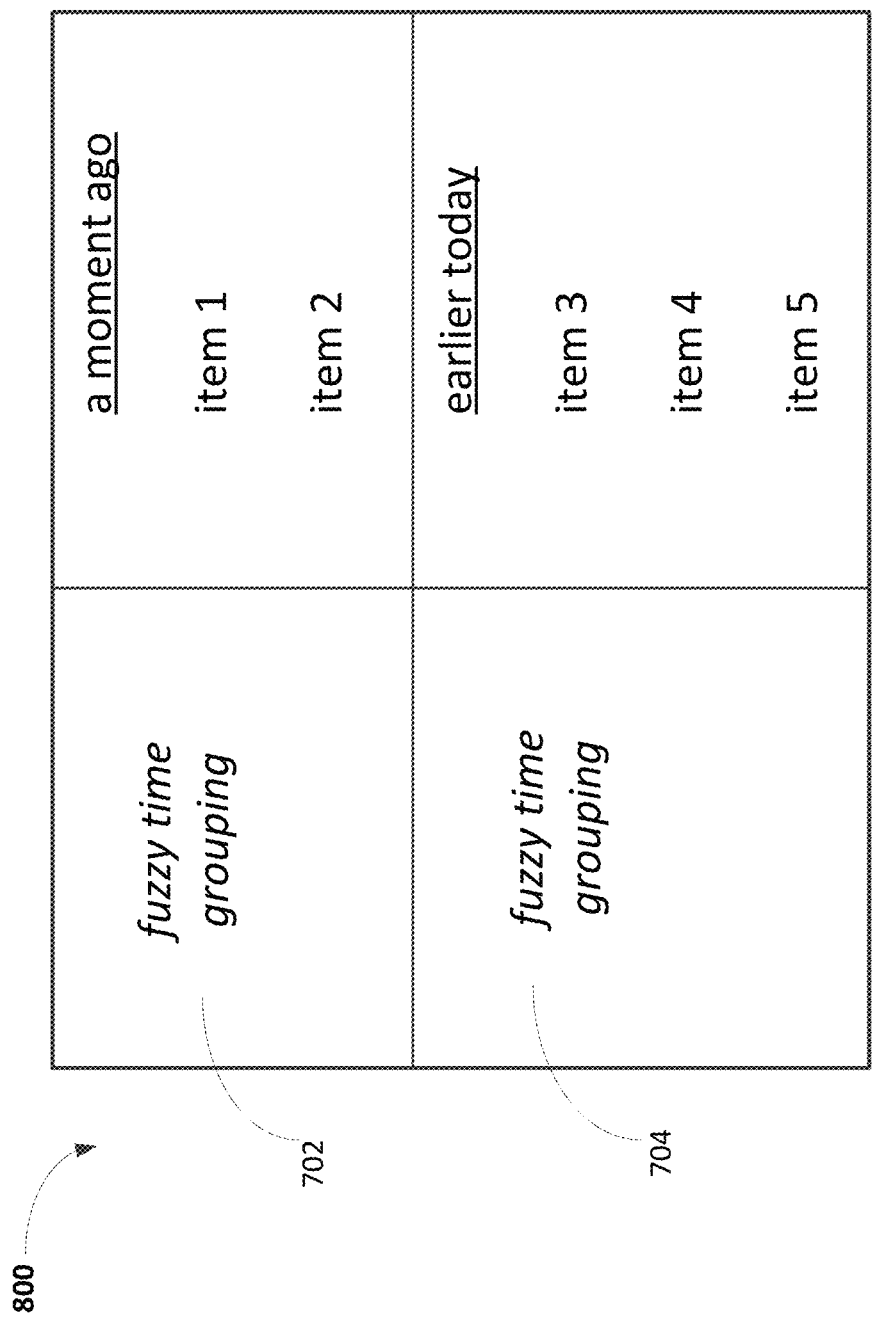
FIG. 8 illustrates fuzzy time grouping of the items shown in FIG. 4 in accordance with some embodiments.

FIG. 8 illustrates fuzzy time grouping 800 of the items shown in FIG. 5 in accordance with some embodiments. As shown in FIG. 8, fuzzy time grouping 800 includes a first fuzzy time grouping 802 and a second fuzzy time grouping 804. In one example, the first fuzzy time grouping 802 includes a grouping of "item 1" having a time-stamp of "10:46 am" and "item 2" having a time-stamp of "10:45 am." In one embodiment, the time-stamps of "item 1" and "item 2" in first fuzzy time grouping 802 is mapped to an implicit audio narration, that may be denoted as "a moment ago." In another example, the second fuzzy time grouping 804 includes a grouping of "item 3" having a time-stamp of "10:15 am," "item 4" having a time-stamp of "9:00 am," and "item 5" having a time-stamp of 7:45 am." In some embodiments, the time-stamps of "item 1," "item 2," and "item 3" in second fuzzy time grouping 804 is mapped to an implicit audio narration, that may be denoted as "earlier today."

Figure 9:
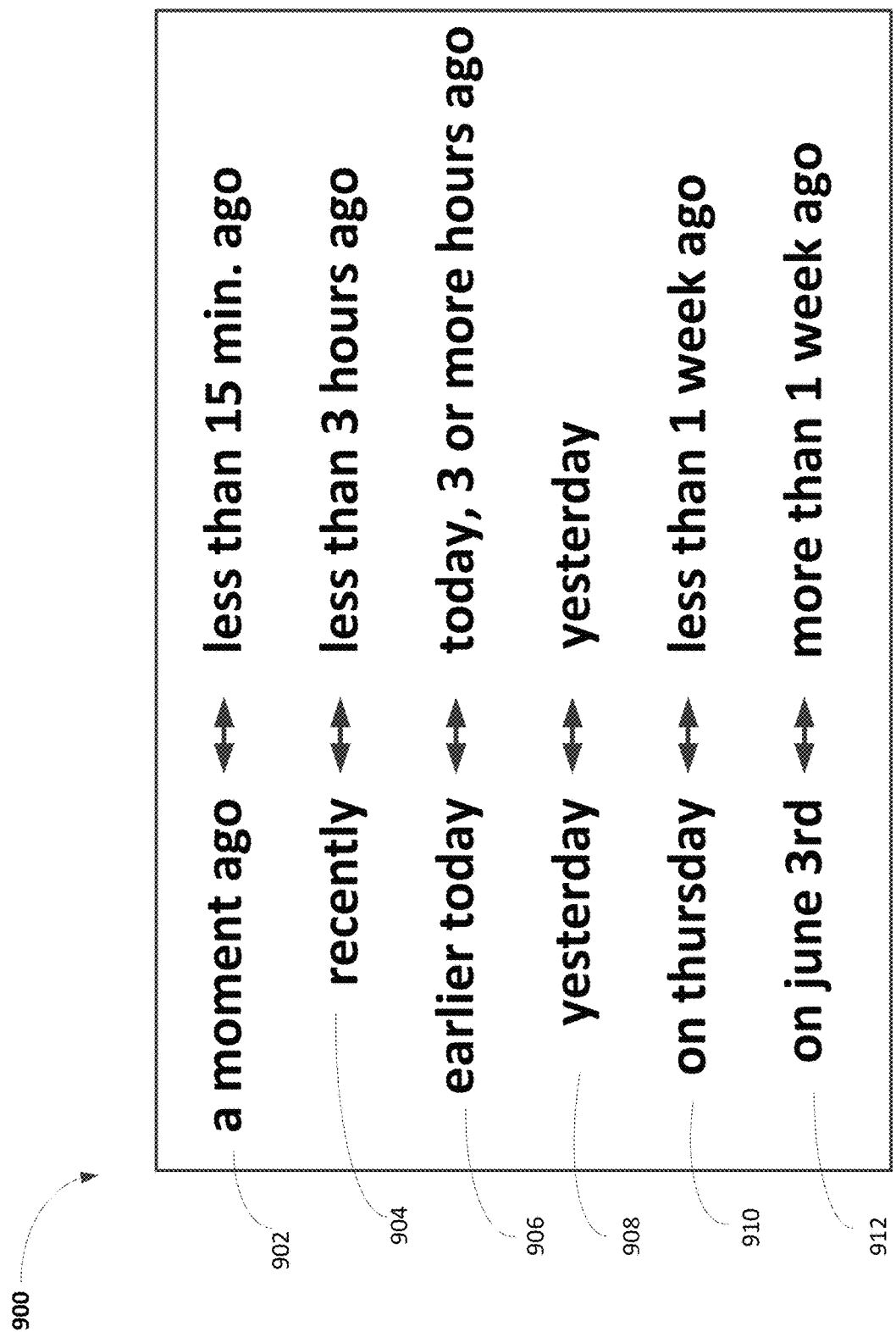
FIG. 9 illustrates mapping of the various times of receipt of electronic messages to audio narration phrases based on fuzzy time groupings in accordance with some embodiments.

FIG. 9 illustrates example mappings 900 of several time durations associated with the receipt of electronic messages to implicit audio narration based on fuzzy time groupings in accordance with some embodiments. The mapping 902 shows an implicit audio narration of "a moment ago" for items having time-stamps that are "less than 15 minutes ago" compared to a current time (in this case, 10:50 am, Jun. 12, 2016, as shown in FIG. 4). The mapping 904 shows an implicit audio narration including "recently" for items having time-stamps that are "less than three hours ago" compared to the current time. The mapping 906 shows an implicit audio narration including "earlier today" for items having time-stamps from "today, more than three hours ago." The mapping 908 shows an implicit audio narration including "yesterday" for items having time-stamps from "yesterday" (i.e., it was sent from 12:00 am to 11:59 pm of yesterday's calendar date (given the current user's time zone). The mapping 910 shows an implicit audio narration including "on Thursday" for items that are "less than a week ago." The mapping 912 shows an audio narration including "on June 3$^{rd}$" for items that are "more than a week ago." In another example (not shown in FIG. 9), if the time stamp is greater than 365 days ago, the month, the day, and the year are used for the implicit audio narration (for example, "December 1$^{st}$, 2011").

FIG. 10 illustrates an example of the implicit audio narration associated with item 418 displayed by the visual user interface shown in FIG. 4, in accordance with some embodiments. In one embodiment, the narration controller 312 receives the textual information corresponding to item 418 and maps the textual information to the implicit audio narration shown in FIG. 10. As shown in FIG. 10, the narration controller 312 maps the time-stamp information in item 418 (in this case, 10:45 am) to "a moment ago." The narration controller 312 also maps the "sender" information in item 418 to "harvey adams." The narration controller 312 further maps the "recipient" information in item 418 to "message to you and 9 others titled." The narration controller 312 also maps the "subject" information in item 418 to "club meeting thursday."

In one example, the method 500 provides for taking an email and generating a "human listenable" summary sentence, which is then read to the user using synthesized speech. The method starts with an email message which is made up of multiple text fields such as timestamp (as to when the email was sent), sender name and email address (the "from" field), receiver names and email addresses (the "to" field combined with the "carbon copy or cc" field), subject, and a message body. Using these fields, the algorithm generates an implicit audio narration, which may be in the form of a sentence. The sentence is then sent to an speech synthesis engine, which then reads out the sentence to the user in a synthesized humanlike voice. In some embodiments, the sentence generated by the method provided herein typically has a template as follows:

[time] [sender] [verb] [direct object] [recipients] [subject]

The following are some examples of sentences that may be generated from emails using the methods provided herein:

First Example

Yesterday, Lyndsay Pyfer wrote you about "Lunch tomorrow."

Second Example

This morning, John Smith asked, "Should we meet on Friday?"

Third Example

On Friday, Frank Anderson sent a message to you and 3 others about "Welcome our newest employee."

In the first example shown above, "Yesterday" is the time, "Lyndsay Pyfer" is the sender, "wrote" is the verb, recipients is "you," and subject is "Lunch tomorrow," and there is no object in the sentence.

In the second example shown above, "This morning" is the time, "John Smith" is the sender, "asked" is the verb, there are no recipients but "you" is implied, "Should we meet on Friday" is the subject and there is no object but "asked" a transitive verb may be used.

In the third example shown above, "On Friday" is the time, "Frank Anderson" is the sender, "sent" is the verb, "a message" is the direct object, "to you and 3 others" is the recipients, and about "Welcome our newest employee" is the subject.

In one embodiment, the time portion of the sentence is generated by taking the current time (from the user's current time zone) and comparing it against the email timestamp. The various rules that are used for picking the time portion of the sentence is discussed in greater detail below under the description for FIG. 9.

The sender field in an email typically may take the form "First-name Last-name email@domain.com." Sometimes the "First-name Last-name" portion may not be included or only a "First-name" is given or some other descriptor for the sender may be used, such as "XYZ Corporation, Inc." The methods provided herein uses the non-email address portion (i.e., "First-name Last-name"), if available. If the First-name and Last-name is not available, the email address (for example, email@domain.com) is used for the sender information. If any metadata is available that discloses the sender's given name then the method uses that information instead of the email address. Such metadata may be available in an organizational address book that may be accessible by the methods described herein. Finally, if the sender is the current user (for example, the email address corresponds to the current user), then "you" is used as the sender for the sentence being prepared for implicit audio narration. Some examples describing the above is shown below:

Example 1

Carol Smith <carol@example> becomes "Carol Smith" (or "Carol" if metadata is available that says "Carol" is the first-name).

Example 2

Some Company, Inc. <company@example.com> becomes "Some Company, Inc."

Example 3

<fred@example.com> becomes "fred@example.com"

In some embodiments, the logic for what verb is used depends on three things, the subject, the recipients, and the message body contents. From these three inputs, the method first generates local metadata that may be used with a set of rules as provided below.

If the subject is prefixed with "Re:" then the email is treated as a reply

If subject ends with a period (".") then it is considered as a complete sentence.

If the subject ends with a question mark ("?") and is not a reply then the message is treated as a question.

If it is a meeting request—the message body contains a meeting invitation

If the subject ends in an exclamation mark ("!"), then the message is treated as an exclamation If the recipient list only contains the current user and no other email addresses, the message is treated as a direct message (example implicit audio narration may include "sent only to you")

If the subject is prefixed with "Fw:" or "Fwd:", then the message is treated as a forward message.

If a message body is a meeting invite and is a forwarded message, the method uses "invited" as the verb followed by the list of recipients and then the original meeting organizer's name followed by the subject and "event" (as in the examples shown below):

Lyndsay invited you to Anna Gregory's "Design Strategy Workshop event"

Lyndsay invited you, Tom, and 3 others to Anna Gregory's "Design Strategy Workshop" event Lyndsay invited the All Employees group to Anna Gregory's Design Strategy Workshop" event.

If the message body is a meeting invite and the current user is the only recipient, the method uses "you're invited to" as the verb. The sender is dropped and instead replaced as the possessive of the indirect object (as in the examples shown below):

You're invited to Ann Gregory's "Design Strategy" event.

You're invite to Jeff's "Party this weekend" event.

If the message body is a meeting invite and the recipient is one or more contacts who are not the current user, the method expands the list of recipients and drops the sender and moves them to the indirect object and uses "are invited" or "is invited" as the verb (as in the examples shown below):

You and five others are invited to John's Design Strategy" event.

The All employees group is invited to the "All-Hands Meeting" event.

If the message is a reply to a meeting invite then randomly pick one of "responded to attendees" or "messaged attendees" as the verb (as in the examples provided below):

Lyndsay responded to attendees of Anna Gregory's "Design Strategy Workshop" event.

Lyndsay message attendees of Anna Gregory's "Design Strategy Workshop" event.

If a message is a reply and the message is a question and the original asker was the current user and the sender is anyone other than the current user, use the verb "answered your question" and drop the recipient (as in the examples provided below)

Charles answered your question about "Parking?"
Jeff answered your question about "What time do we meet tomorrow?"

If a message is a reply and the message is a question and the original asker is not the current user, the method uses the verb "answered the question" and drops the recipient (as in the examples provided below):

Charles answered the question, "Where are we?"
Jeff answered the question, "How much time do we have left on the project?"

If a message is a reply and not a question, the method randomly picjs "replied to a message" or "followed up on a message" as the verb and direct object (as in the examples provided below).

Lyndsay replied to a message about "Book Club."
Lyndsay followed up on a message about "Travel info."

If the message is a reply to all, omit the recipients and randomly pick one of the verbs "responded to," "reacted to," or "commented on." The direct object is "the discussion." Some examples are provided below:

Jim responded to the discussion about "Sales numbers."
Jim reacted to the discussion about "Summer vacations."
Arnold commented on the discussion about "Reports."

If the message is a forward, randomly pick the verb out of "forwarded," passed along," and "circulated". Use "message" as the direct object. If "circulated" is used, drop the recipient. Some examples are provided below:

John forwarded you a message about "Sales numbers"
Agnes passed along to you and Sam a message about "New bottle designs."
Mindy circulated a message about "Traffic this weekend."

If a subject is a complete sentence, then the method randomly picks one of the following: "wrote," "sent," "messaged," "emailed." If "sent" is used, the direct object is "a message." For example, "John Smith sent you a message about "Meeting on Tuesday"."

If subject is a question, the method randomly picks a verb out of the following: "asked," "wanted to know," "wondered." The recipient is omitted and there is no direct object. An example is provided below:

"Frank asked, "Are you free tomorrow?" (this is narrated regardless of the recipients)

If the subject has an exclamation, the verb used would be "exclaimed." The recipients are omitted and there is no direct object. An example of this is provided below:

Lyndsay Pyfer exclaimed, "Donuts in kitchen!"

If none of the above rules apply and message was sent to only the user, then the method randomly picks the verb out of "messaged you," "wrote you," "reached out to you," "sent you a message" and insert "about" before the subject. Some examples are provided below:

John Smith wrote you about "Samples"
John Smith reached out to you about "Gold tournament."
John Smith sent you a message about "Tax returns."

If none of the above rules apply and the message is sent to one recipient that is a group email address, randomly pick the verb out of "messaged," "emailed," "distributed a message to." Some examples are included below:

Fred distributed a message to All Employees group and 2 others about "Sandwiches in the kitchen."
Shane messaged the Partytime group about "Get-together this weekend."

If none of the above apply and message is sent to multiple recipients, randomly pick one of the verbs "message," wrote," "reached out to," "sent a message to" followed by a list of the recipients.

Similar to the sender portion of the sentence that is described above, the recipients information is extracted for each recipient on the list. If no "first-name last-name" is found, then the raw email address is used. If the recipient is a group, the name is prefixed with "the" and suffixed with "group" (for example, "the All Employees group," "the Volunteer Organizers group"). When the current user is the recipient, "you" is used instead of their name or email address. In some cases, the recipient is dropped from the sentence. For instance when "asked" is the verb, the recipient is dropped (for example, "John Smith asked "Where are the reports?," "Fred wondered "where is the meeting tomorrow?." If the recipient is one or more contacts, then list out the recipients in the order in which they appear in the recipient field, but ensure the current user is sorted to the front of the list. If the current user is in the recipient list, use "You" instead of their "first-name last-name" or email address. If there are 4 or more recipients, drop the last "n−2" and replace them with "(n−2) others (where "n" is the total number of recipients." Some examples of such an implantation are provided below:

Two recipients where current user is one recipient and other is "Brad Johnson brad@example.com" becomes "You and Brad."

Three recipients where current user is one recipient and others are "Brad Johnson brad@example.com" and "Fred fred@example.com" becomes "You, Brad, and Fred."

Four recipients: "Amy amy@example.com" "Brad Johnson brad@example.com," "Carol carol@example.com" and "Fred fred@example.com" becomes "Amy, Brad and 2 others."

The subject portion of the message is generally includes as-is except in the case that it contains any of the following prefixes: "fwd:", "fw:", and "re:". If any of these appear as a prefix in the subject, they are removed. Some examples of these are provided below:

"Re: Can we get some samples?" is mapped to "Can we get some samples"
"Fw: Here is a funny email" is mapped to "Here is a funny email"
"Need samples" stays the same
"Question about the document" stays the same In some embodiments, software described herein may be executed by a server, and a user may access and interact with the software application using a portable communication device. Also, in some embodiments, functionality provided by the software application as described above may be distributed between a software application executed by a user's portable communication device and a software application executed by another electronic process or device (for example, a server) external to the portable communication device. For example, a user can execute a software application (for example, a mobile application) installed on his or her smart device, which may be configured to communicate with another software application installed on a server.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. A device or structure that is "configured" in a certain way is configured in at least that way, but may also be configured in ways that are not listed.

Thus, embodiments of the invention provides, among other things, systems and methods for implicit narration. Various features and advantages of some embodiments are set forth in the following claims.

What is claimed is:

1. A computing device comprising:
    a visual user interface including textual information and graphical information; and
    an electronic processor configured to:
        map each field of the textual information of the visual user interface to an implicit audio narration, wherein mapping a field of the textual information to the implicit audio narration has a scalable level of precision based on a context of content in the visual user interface,
        map the graphical information to the implicit audio narration, wherein mapping the graphical information to the implicit audio narration includes mapping a graphical icon to an application name, and
        output the implicit audio narration.

2. The computing device of claim 1, wherein the electronic processor is further configured to
    analyze the visual user interface, and
    determine, for each field of the textual information, the scalable level of precision for mapping the field of the textual information to the implicit audio narration.

3. The computing device of claim 1, wherein the electronic processor is further configured to
    map a first field of the textual information including a time-stamp to a first segment of the implicit audio narration, the first segment of the implicit audio narration including a relative indication of a duration associated with the time-stamp with respect to a reference time.

4. The computing device of claim 1, wherein the textual information is selected from a group consisting of an email, a text message, and a notification from a software application.

5. The computing device of claim 1, wherein the electronic processor is further configured to
    map a first field of the textual information to a first segment of the implicit audio narration, the first segment of the implicit audio narration including a variation of at least one of a vocabulary and grammar associated with the first field of the textual information.

6. The computing device of claim 1, wherein the electronic processor is further configured to
    determine a fuzzy time grouping for a plurality of time-stamps associated with the textual information; and
    output the implicit audio narration including the fuzzy time grouping.

7. A method for controlling narration, the method comprising:
    receiving a textual information from a visual user interface;
        mapping, with an electronic processor, each field of the textual information from the visual user interface to an implicit audio narration, wherein mapping a field of the textual information to the implicit audio narration has a scalable level of precision based on a context of content in the visual user interface,
        receiving graphical information from a visual user interface,
        mapping the graphical information to the implicit audio narration, wherein mapping the graphical information to the implicit audio narration includes mapping a graphical icon to an application name, and
        outputting the implicit audio narration.

8. The method of claim 7, further comprising
    analyzing, with the electronic processor, the textual information received from the visual user interface, and
    determining for each field of the textual information, the scalable level of precision for mapping the field of the textual information to the implicit audio narration.

9. The method of claim 7, further comprising:
    mapping, with the electronic processor, a first field of the textual information including a time-stamp to a first segment of the implicit audio narration, the first segment of the implicit audio narration including a relative indication of a time associated with the time-stamp with respect to a reference time.

10. The method of claim 7, further comprising:
    mapping, with the electronic processor, a first field of the textual information to a first segment of the implicit audio narration, the first segment of the implicit audio narration including a variation of at least one of a vocabulary and a grammar associated with the first field of the textual information.

11. The method of claim 7, wherein the textual information is selected from a group consisting of an email, a text message, and a notification from a software application.

12. The method of claim 7, further comprising:
    determining a fuzzy time grouping for a plurality of time-stamps associated with the textual information; and
    outputting the implicit audio narration including the fuzzy time grouping.

13. A non-transitory machine-readable medium containing computer-executable instructions that when executed by one or more processors cause the one or more processors to perform a method for controlling narration, the method comprising:
    receiving textual information from a visual user interface,
        mapping each field of the textual information from the visual user interface to an implicit audio narration, wherein mapping a field of the textual information to the implicit audio narration has a scalable level of the precision based on a context of content in the visual user interface,
        receiving graphical information from a visual user interface, mapping the graphical information to the implicit audio narration, wherein mapping the graphical information to the implicit audio narration includes mapping a graphical icon to an application name, and
outputting the implicit audio narration.

14. The non-transitory machine-readable medium of claim 13, wherein the method further comprises:
analyzing the visual user interface; and
determining, for each field of the textual information, the scalable level of precision for mapping the field of the textual information to the implicit audio narration.

15. The non-transitory machine-readable medium of claim 13, wherein the method further comprises:
mapping a first field of the textual information, including a time-stamp to a first segment of the implicit audio narration, the first segment of the implicit audio narration including a relative indication of a time associated with the time-stamp.

16. The non-transitory machine-readable medium of claim 13, wherein the method further comprises:
mapping a first field of the textual information to a first segment of the implicit audio narration, the first segment of the implicit audio narration including a variation of at least one of a vocabulary and grammar associated with the first field of the textual information.

17. The non-transitory machine-readable medium of claim 13, wherein the textual information is selected from a group consisting of an email, a text message, and a notification from a software application.

* * * * *